United States Patent
Detrois et al.

(10) Patent No.: US 8,914,190 B2
(45) Date of Patent: Dec. 16, 2014

(54) METHOD AND DEVICE FOR OPERATING A BELT DRIVE OF A MOTOR VEHICLE

(75) Inventors: Yves Detrois, Renningen (DE); Rolf Jaros, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 278 days.

(21) Appl. No.: 13/500,453

(22) PCT Filed: Oct. 13, 2010

(86) PCT No.: PCT/EP2010/065308
§ 371 (c)(1),
(2), (4) Date: Jun. 28, 2012

(87) PCT Pub. No.: WO2011/047992
PCT Pub. Date: Apr. 28, 2011

(65) Prior Publication Data
US 2012/0259510 A1 Oct. 11, 2012

(30) Foreign Application Priority Data

Oct. 21, 2009 (DE) .......................... 10 2009 045 880

(51) Int. Cl.
*G06F 7/00* (2006.01)
*F16H 7/12* (2006.01)
*F02B 67/06* (2006.01)
*F16H 7/08* (2006.01)

(52) U.S. Cl.
CPC ...... *F16H 7/1281* (2013.01); *F16H 2007/0887* (2013.01); *F16H 2007/0823* (2013.01); *F16H 2007/0885* (2013.01); *F16H 2007/0893* (2013.01); *F02B 67/06* (2013.01); *F16H 2007/0806* (2013.01)
USPC ................................. 701/36; 701/1

(58) Field of Classification Search
USPC ............................ 701/36; 474/101
See application file for complete search history.

(56) References Cited

U.S. PATENT DOCUMENTS

| 4,478,595 | A | * | 10/1984 | Hayakawa et al. | ........... 474/109 |
| 4,959,042 | A | | 9/1990 | Tanaka et al. | |
| 5,780,731 | A | * | 7/1998 | Matsui et al. | ............... 73/114.01 |
| 6,834,228 | B2 | * | 12/2004 | Serkh et al. | .................... 701/115 |
| 6,857,978 | B2 | * | 2/2005 | Polster et al. | ................. 474/134 |
| 6,953,407 | B2 | | 10/2005 | Kitamura et al. | |
| 7,011,591 | B2 | * | 3/2006 | Nakamura | ...................... 474/70 |
| 7,226,377 | B2 | | 6/2007 | Kraus et al. | |
| 8,112,193 | B2 | * | 2/2012 | Yurgil | .......................... 701/33.8 |

(Continued)

FOREIGN PATENT DOCUMENTS

| CN | 1633566 | 6/2005 |
| CN | 1657802 | 8/2005 |

(Continued)

OTHER PUBLICATIONS

International Search Report, PCT International Application No. PCT/EP2010/065308, dated Jan. 19, 2011.

*Primary Examiner* — Bhavesh V Amin
(74) *Attorney, Agent, or Firm* — Kenyon & Kenyon LLP

(57) ABSTRACT

A method and a device for operating a belt drive of a motor vehicle. Under high loads, a high belt tension is set and during normal operation a low belt tension is set. The particular belt tension is set through a control process, taking into account the instantaneous load on the belt drive and/or taking into account the age of the belt of the belt drive.

18 Claims, 2 Drawing Sheets

(56) References Cited

U.S. PATENT DOCUMENTS

| | | | |
|---|---|---|---|
| 8,215,282 B2 * | 7/2012 | McDonald et al. | 123/198 R |
| 8,495,978 B2 * | 7/2013 | Grossman | 123/90.27 |
| 2002/0123401 A1 * | 9/2002 | Henry | 474/101 |
| 2003/0083803 A1 * | 5/2003 | Serkh et al. | 701/115 |
| 2003/0199350 A1 * | 10/2003 | Henry | 474/138 |
| 2003/0220164 A1 * | 11/2003 | Tamai | 474/134 |
| 2003/0236143 A1 * | 12/2003 | Tange | 474/101 |
| 2004/0072643 A1 * | 4/2004 | Berndt et al. | 474/135 |
| 2004/0092349 A1 * | 5/2004 | Iwamoto et al. | 474/109 |
| 2004/0227400 A1 | 11/2004 | Kraus et al. | |
| 2005/0083188 A1 | 4/2005 | Choi | |
| 2005/0192142 A1 * | 9/2005 | Stone et al. | 474/101 |

FOREIGN PATENT DOCUMENTS

| | | |
|---|---|---|
| CN | 1668863 | 9/2005 |
| CN | 201065923 | 5/2008 |
| DE | 101 53 329 | 6/2002 |
| DE | 10153329 | 6/2002 |
| DE | 100 61 895 | 7/2002 |
| DE | 101 18 277 | 10/2002 |
| DE | 102 25 268 | 12/2003 |
| DE | 102 35 533 | 2/2004 |
| DE | 603 12 255 | 11/2007 |
| DE | 10 2007 055 547 | 5/2009 |
| WO | WO 03/027537 | 4/2003 |
| WO | WO 03/036133 | 5/2003 |

* cited by examiner

METHOD AND DEVICE FOR OPERATING A BELT DRIVE OF A MOTOR VEHICLE

FIELD OF THE INVENTION

The present invention relates to a method and a device for operating a belt drive of a motor vehicle.

BACKGROUND INFORMATION

Motor vehicles having a belt-driven drive are conventional. For example, German Patent Application No. DE 101 53 329 A1 describes a belt transmission device which has a pulley of a rotating electric machine for transmitting a starter force to an engine, a motor pulley for transmitting the starter force to the engine and also for transmitting a rotational force of the engine to a component part and an auxiliary pulley which is driven to rotate by the force of the motor pulley in order to drive the component part in the process. Furthermore, the conventional device has a belt, which is wound around the pulley of the rotating electric machine, the motor pulley and the auxiliary pulley, and a belt tension setting element for tensioning the belt in order to set the tension of the belt for a plurality of operating states. This tension setting element functions in such a way that the belt tension is set to a high belt tension value, when the engine is started by the rotating electric machine, and is set to a low belt tension value, when the engine is in a subsequent normal operation. This setting of the belt tension is controlled by a control unit which is supplied with sensor signals.

SUMMARY

An example method in accordance with the present invention may have the advantage that the efficiency of the belt drive is improved. This is achieved in that the particular belt tension is set through a regulation process taking into account the instantaneous load on the belt drive and/or taking into account the age of the belt of the belt drive; an anticipatory adaptation of the belt tension may also take place.

Preferably, after setting the particular belt tension, it is checked whether undesirable belt slippage is present. If this is the case, the belt tension is incrementally increased until undesirable slippage is no longer detected. Undesirable belt slippage is present when the belt slippage is greater than a predefined limiting value. This is, for example, the case when the belt moves 5% faster than the associated belt pulley.

Furthermore, it is preferably checked whether the instantaneous belt tension may be reduced or, if needed, must be increased. This is checked in an electronic regulator of a control unit which controls an actuator in such a way that the actuator sets the belt tension as desired in each individual case. When ascertaining these control signals, the electronic regulator preferably takes into account sensor signals and/or information of other control units. In particular, the electronic regulator ascertains the control signals as a function of the instantaneously engaged loads, of a prediction of a required belt tension, of aging effects of the belt and by evaluating the speed difference signals or by making use of stored tables or stored models.

In the present invention, not just a simple switching between multiple predefined belt tension values occurs, but also a continuous or incremental adaptation of the belt tension as a function of the instantaneous state of the belt drive or the instantaneous load on the belt drive. Even aging effects may be compensated for in an advantageous manner. Consequently, the particular set belt tension value in the particular operating state is not fixed but depends on the parameters which change in the course of the operation of the belt drive.

Advantageously, the belt tension of a belt drive of a motor vehicle is set in such a way that unnecessary losses in the belt drive as well as unnecessary loads on the material, e.g., of the belt, the bearings, the suspension points, etc., are avoided in each of the different operating states. At the same time, it is ensured, however, that an adequate power transmission via the belt may take place at all times. In particular, it is ensured by a belt-driven starter generator that a high belt tension is set when the internal combustion engine is started, and that a low belt tension required during all the other operating states is set in each case with the aid of a regulating device.

Further advantageous characteristics of the present invention result from the exemplary description with reference to the figures.

DETAILED DESCRIPTION OF EXAMPLE EMBODIMENTS

Figure 1:
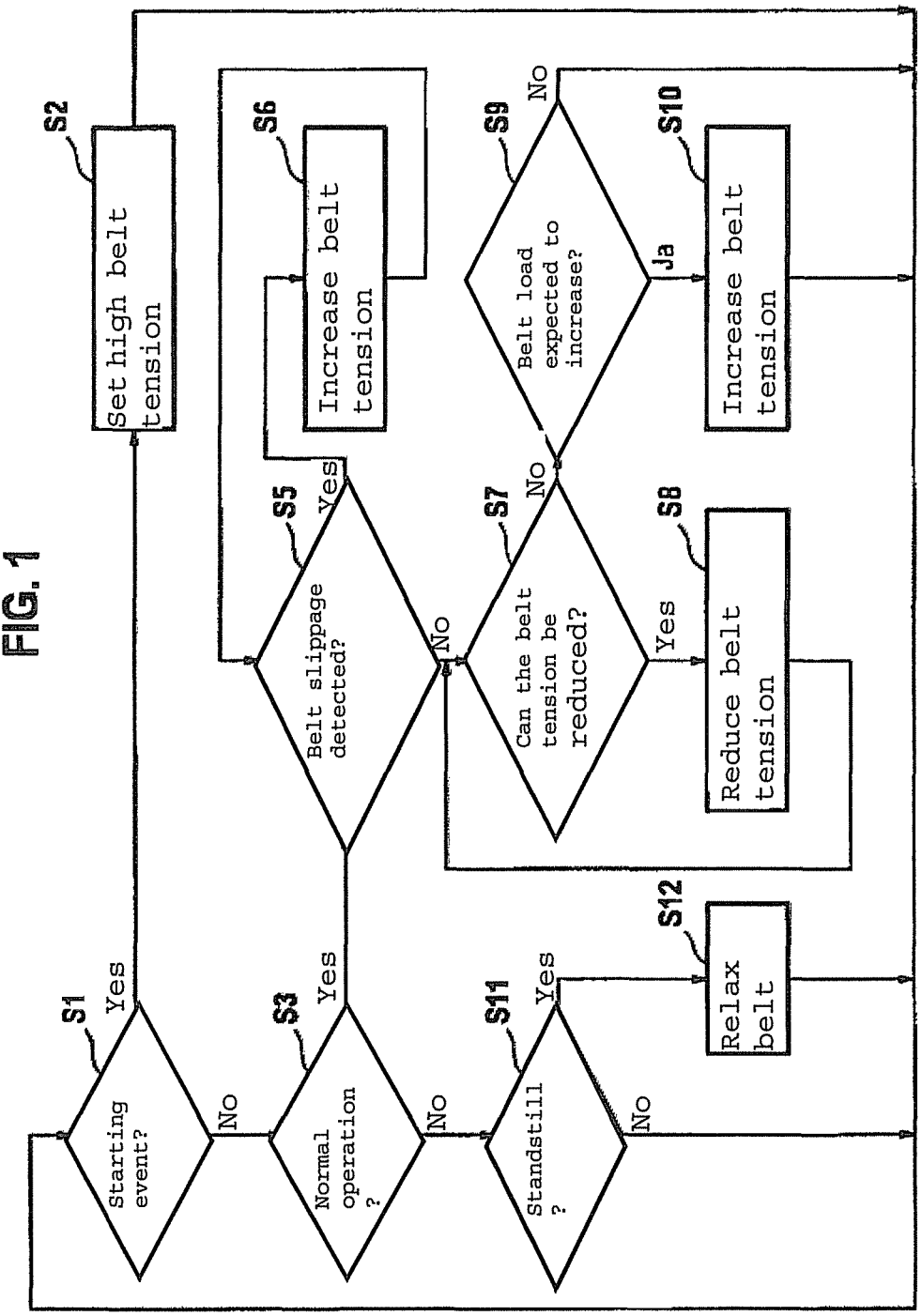
FIG. 1 shows a flow chart for explaining an example method for operating a belt drive of a motor vehicle.

FIG. 1 shows a flow chart for elucidating an example method for operating a belt drive of a motor vehicle.

In a step S1 of this method, a query is initially made as to whether a starting of the internal combustion engine of the motor vehicle is present or is to be expected. If it is recognized in step S1 that a starting of the internal combustion engine of the motor vehicle is present or is to be expected, then a high belt tension is set in a step S2.

If it is not recognized in step S1 that a starting of the internal combustion engine of the motor vehicle is present or is to be expected, a query is made in a step S3 as to whether a normal operation of the motor vehicle is present. Normal operation is, for example, understood to mean the normal driving operation of the motor vehicle during which the motor vehicle is moved while the crankshaft is rotating and the starter generator functions as a generator.

If it is recognized in step S3 that normal operation is present, a query is made in a step S5 as to whether an undesirable belt slippage is present. For this purpose, the speed of the belt pulley of the starter generator of the motor vehicle and the speed of the belt pulley on the crankshaft of the motor vehicle are measured, for example, and the speed difference is ascertained from these speed values. The previously mentioned speeds are either already present in other control units and are transmitted from there to the control unit provided for the belt drive or they are obtained by using speed sensors and forwarded to the control unit.

If it is recognized in step S5 that an undesirable belt slippage is present, the belt tension is increased according to a step S6. This increase preferably takes place incrementally, i.e., the belt tension is increased by a small belt tension value.

After this increase in the belt tension, the process jumps back to step S5 to check again whether an undesirable belt slippage is present. If this is the case, the belt tension is increased again in step S6 by a small belt tension value, etc. This takes place until no undesirable belt slippage is present.

If it is recognized in step S5 that no undesirable belt slippage is present, the process branches to step S7. In step S7, a query is made as to whether the instantaneously present belt tension may be reduced. This is, for example, the case when the load on the drive has been reduced by a switch-off of additional components and/or when the speed of the crankshaft of the internal combustion engine has reached a predefined speed value. During this check, models or tables are preferably made use of which were stored in a memory of the control unit when the motor vehicle was manufactured and contain the speed setpoint values for a plurality of different operating modes or load states of the motor vehicle, for example.

If it is recognized in step S7 that a reduction of the belt tension is possible, the belt tension is reduced in a step S8. After that, the process jumps back to step S7 to check again whether the belt tension may be reduced. If this is the case, the belt tension is again reduced in step S8, etc. This takes place until it is recognized in step S7 that a reduction of the belt tension is not possible.

If it is recognized in step S7 that a reduction of the belt tension is not possible, the process branches to step S9.

In step S9, a query is made as to whether an increase in the belt load is to be expected. Within the scope of this query, the belt tension is, for example, predicted based on known parameters. When engaging a load, e.g., an air-conditioning compressor, the belt tension may be increased before a belt slippage occurs. As an alternative, the future belt tension may be deduced from a prediction of the generator load. This applies, in particular, to recuperating systems.

If it is recognized in step S9 that an increase in the belt load is to be expected, the belt tension is increased in a step S10. After step S10, the process jumps back to step S1. If, however, it is recognized in step S9 that an increase in the belt load is not to be expected, the process jumps back to step S1.

If it is recognized in step S3 that no normal operation is present, a transition is made to a step S11. It is checked in this step S11 whether the generator is at a standstill.

If it is recognized in step S11 that the generator is at a standstill, the process branches to step S12. In step S12, the belt is relaxed.

After step S12, the process jumps back to step S1. If it is recognized in step S11 that a standstill of the generator is not present, the process also jumps back to step S1.

The example method described above is preferably carried out by an electronic regulator of a control unit, this control unit being connected to an actuator which is provided for setting the belt tension required in each case.

In the starting event, the starter generator of the vehicle functions as an electric motor. The control unit prompts the actuator to set or build up a high belt tension. The value of the high belt tension is preferably modifiable and is modified or regulated during the operation of the motor vehicle as a function of aging effects and as a function of the load on the belt drive present in each case. By setting a high belt tension during the starting event it is achieved that the torque transmittable to the crankshaft of the motor vehicle is adequate to drive the crankshaft.

During normal operation, the starter generator of the vehicle functions as a generator. The control unit prompts the actuator to set a lower, but not a too low, belt tension and to ensure a reliable function of the belt drive. Particular attention is paid so that no undesirable slippage occurs and that the belt tension is not higher than necessary. By setting a low belt tension during the normal operation, a reduction of the losses in the belt drive is achieved. This results in a reduction of the fuel consumption and the $CO_2$ emissions of the motor vehicle. Furthermore, the service life of all the shaft bearings in the belt drive is increased. This includes the main crankshaft bearing, the generator bearing, the water pump bearing, the air-conditioning compressor bearing and the power steering pump bearing. Furthermore, the service life of the belt is increased and also a cost reduction is achieved since the bearings and the belts may have a more cost-effective design.

According to an example embodiment of the present invention, the belt tension is set continuously or incrementally. Simply switching between fixed belt tensions is not sufficient since the load on the belt drive varies as a function of the speed and the load caused by the instantaneously connected components. In the event of constant electric generator load, the absorbed torque of the generator drops linearly with the speed.

To check whether undesirable slippage is present, a speed difference between the speed of the belt pulley of the starter generator and the belt pulley on the crankshaft is ascertained, as already explained above.

To check whether the belt is too tight, the speed difference may also be evaluated. This may be carried out during a brief relaxing of the belt up to the slippage threshold or during a load increase, e.g., a load increase on the generator. Alternatively or additionally, it is possible to ascertain whether the belt is too tight by taking into account a model stored in a memory of the control unit or a stored table. The required belt tension may be ascertained by taking into account the speed and/or the load on connected components.

The required belt tension may be predicted based on known parameters. For example, the belt tension may be increased when a load is engaged, before an undesirable belt slippage occurs. Another possibility is to predict a required belt tension as a function of the instantaneously engaged loads by using a stored table or a stored model. The required belt tension may also be predicted by using a table, in which data that takes into account the aging of the belt, are stored. In the presence of a starting request, the belt tension may already be increased at a point in time which lies before the actual starting process.

In the event of a standstill of the belt drive, a low belt tension may be set in order to protect the bearings of the device and the belt itself. The setting of this low belt tension preferably occurs only when it is possible to exclude a restart in the near future, because otherwise the time for building up the belt tension to the required degree is delayed.

Figure 2:
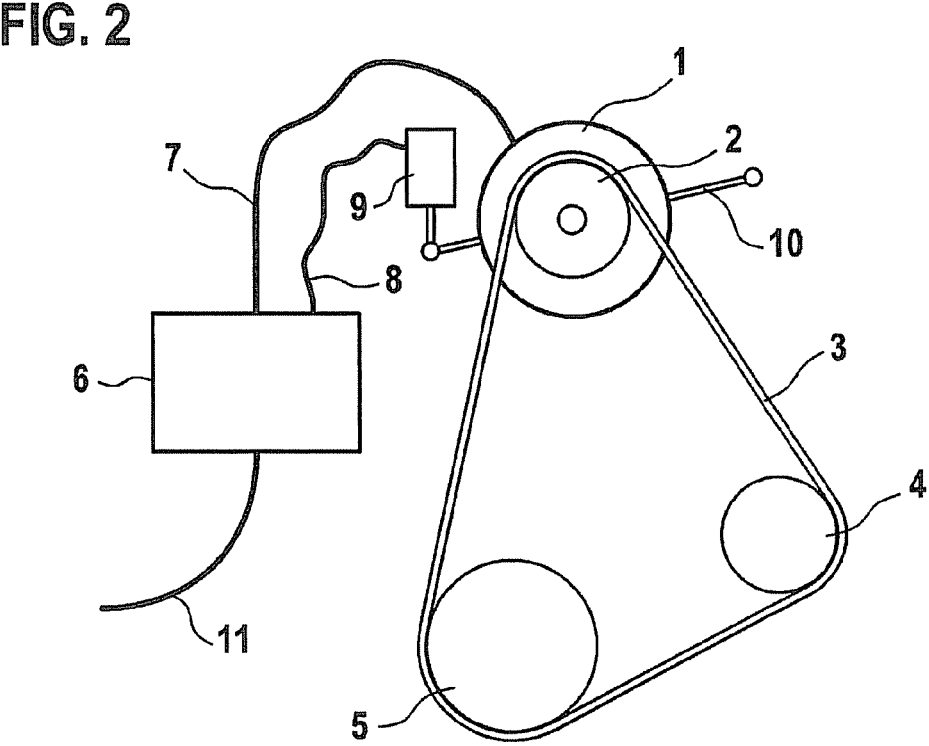
FIGS. 2 and 3 show a simplified drawing for explaining an example device for operating a belt drive of a motor vehicle.
Figure 3:
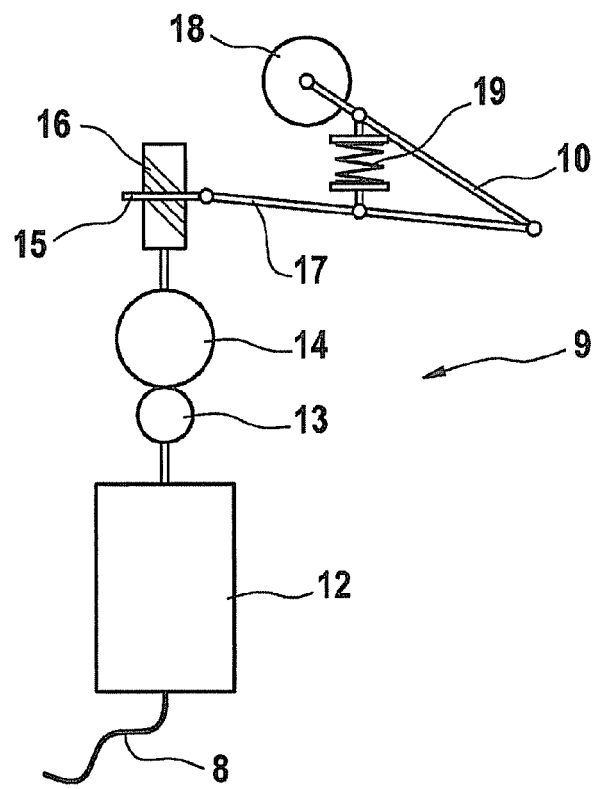

FIGS. 2 and 3 show simplified drawings for explaining an example device for operating a belt drive of a motor vehicle.

The device illustrated in FIG. 2 has a belt-driven starter generator 1, a belt pulley 2 connected to it, a drive belt 3, an idler and tension pulley 4, a belt pulley 5 situated on the crankshaft of the motor vehicle, a control unit 6, a line 7, another line 8, an actuator 9, a lever 10 for changing the position of generator 1, and a communication line 11.

Drive belt 3 transmits power between belt pulley 5 of the crankshaft and belt pulley 2 of starter generator 1. Additional tension pulleys or belt pulleys may be used here. During a starting process of the internal combustion engine, starter generator 1 functions as an electric motor and transmits its output power to crankshaft 5 via belt 3. Due to the high torques acting in the process a high belt tension is set. During normal operation of the internal combustion engine, the starter generator functions as a generator and is driven by belt 3. In this case, the transmitted torque is lower. For this reason, a reduced belt tension is set during normal operation. The belt tension required in each case depends on the different parameters. Here, the torque to be transmitted is particularly important. That, in turn, depends on the load on the belt drive caused by instantaneously connected components and on the speed.

An electronic regulator, which is provided in control unit 6, is provided for ascertaining an ideal belt tension in each case and to initiate its setting. When ascertaining the ideal belt tension in each case, the regulator takes into account the speed of the starter generator, the speed of the crankshaft or the internal combustion engine, the operating state of the connected components, the capacity utilization of the generator, the mode of the starter generator and the instantaneous temperature.

Control unit 6 communicates via communication line 11 with other signal and data sources as well as signal receivers. The latter are control units and sensors, in particular.

To influence the belt tension, control unit 6 transmits electrical signals to actuator 9 via line 8. Actuator 9 deflects one or multiple of the present belt pulleys and/or tension pulleys in such a way that the belt tension desired in each case is set. The power for activating actuator 9 may, for example, be provided electrically, hydraulically or pneumatically. Actuator 9 may be advantageously supported by storage elements (springs) or by automatic reinforcement.

One exemplary embodiment for actuator 9 is shown in FIG. 3. In this exemplary embodiment, the control signal provided by the control unit is conducted to an electric motor 12 via line 8. Electric motor 12 is a permanently excited DC machine or an electronically commutated motor. It is connected to gear wheels 13 and 14 which form a first gear. With the aid of a worm 16 and a counterpart 15, the rotary movement of the motor is converted into a translatory movement of lever 17. Thereby, it is ensured that self-locking prevents the belt tension from drifting off. With the aid of lever 17, a lever 10 and a spring 19, the force made available by the motor is transmitted to a tension pulley 18 which sets the belt tension in the desired manner.

Exemplary embodiments have been explained above in which a starter generator is used. Alternatively, the present invention may also be used in the presence of a pure generator system for regulating the belt tension. In this alternative, steps S1 and S2 shown in FIG. 1 are dispensed with.

What is claimed is:

1. A method for operating a belt drive of a motor vehicle in which a high belt tension is set under high loads and a low belt tension is set during normal operation, the method comprising:
    setting a particular belt tension through a control process, at least one of taking into account an instantaneous load on the belt drive, and taking into account an age of a belt of the belt drive;
    checking whether undesirable belt slippage is present, after setting the particular belt tension;
    incrementally increasing the belt tension, upon recognition of an undesirable belt slippage, until a nonexistence of the undesirable belt slippage is detected; and
    checking upon recognition of the nonexistence of undesirable belt slippage, whether the belt tension may be reduced.

2. The method as recited in claim 1, wherein, at nonexistence of a starting process and nonexistence of normal operation, checking whether a standstill of a generator of the motor vehicle is present.

3. The method as recited in claim 2, wherein the belt tension is reduced upon recognition of the standstill of the generator.

4. The method as recited in claim 2, wherein the belt tension is reduced upon recognition that the belt tension may be reduced.

5. The method as recited in claim 4, wherein it is checked whether an increase in the belt load is to be expected if it is not recognized that the belt tension may be reduced.

6. The method as recited in claim 5, wherein the belt tension is increased upon recognition that an increase in the belt load is to be expected.

7. The method as recited in claim 1, wherein the control process is carried out by an electronic regulator of a control unit of the motor vehicle.

8. The method as recited in claim 7, wherein the electronic regulator supplies control signals to an actuator to modify a belt tension value.

9. The method as recited in claim 8, wherein the electronic regulator ascertains the control signals by taking into account at least one of sensor signals, and information of other control units.

10. The method as recited in claim 9, wherein the electronic regulator ascertains a speed difference signal when checking whether undesirable slippage is present.

11. The method as recited in claim 10, wherein the electronic regulator one of ascertains a speed difference signal, uses data from a stored model, or uses data from a stored table, when checking whether the belt tension may be reduced.

12. The method as recited in claim 8, wherein the electronic regulator predicts a required belt tension when ascertaining the control signals.

13. A device for operating a belt drive of a motor vehicle comprising a generator, a belt pulley connected to the generator, a crankshaft, a belt pulley connected to the crankshaft, a control unit connected to the generator via a first line, a drive belt which is wound around the belt pulley of the generator and the belt pulley on the crankshaft, and an actuator for setting a belt tension value which is connected to the control unit, wherein the control unit has an electronic regulator which is configured to set a particular belt tension through a control process, at least one of taking into account an instantaneous load on the belt drive, and taking into account an age of a belt of the belt drive, to check whether undesirable belt slippage is present, after setting the particular belt tension, to incrementally increase the belt tension, upon recognition of an undesirable belt slippage, until a nonexistence of the undesirable belt slippage is detected, and to check upon recognition of the nonexistence of undesirable belt slippage, whether the belt tension may be reduced.

14. The device as recited in claim 13, wherein the generator is a starter generator.

15. The method as recited in claim 1, wherein the incremental increase includes repetitively adding a predetermined small amount of belt tension until the combined added tensions form a larger amount sufficient to provide the nonexistence of the undesirable belt slippage.

16. The method as recited in claim 1, wherein the method is performed such that all belt tension values set during a non-start event state are lower than a tension value set for a start event state.

17. The method as recited in claim 1, wherein the checking for the presence of the undesirable belt slippage includes comparing (a) a speed of a belt pulley connected to a starter generator to (b) a speed of a pulley connected to a crankshaft.

18. The method as recited in claim 1, wherein the setting of the particular belt tension is performed taking into account the age of the belt.

* * * * *